US008838663B2

(12) United States Patent
Tang et al.

(10) Patent No.: US 8,838,663 B2
(45) Date of Patent: Sep. 16, 2014

(54) METHOD AND APPARATUS FOR PERFORMING MULTIPLICATIVE FUNCTIONS

(75) Inventors: Ping Tak Peter Tang, Castro Valley, CA (US); Robert Cavin, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1352 days.

(21) Appl. No.: 11/731,580

(22) Filed: Mar. 30, 2007

(65) Prior Publication Data
US 2008/0243985 A1  Oct. 2, 2008

(51) Int. Cl.
*G06F 7/48* (2006.01)
*G06F 7/535* (2006.01)
*G06F 7/544* (2006.01)
*G06F 7/483* (2006.01)

(52) U.S. Cl.
CPC ........ *G06F 7/535* (2013.01); *G06F 2207/5356* (2013.01); *G06F 7/5443* (2013.01); *G06F 2207/5354* (2013.01); *G06F 7/483* (2013.01)
USPC ...................................................... 708/502

(58) Field of Classification Search
None
See application file for complete search history.

(56) References Cited

U.S. PATENT DOCUMENTS

| | | | | |
|---|---|---|---|---|
| 5,515,308 | A * | 5/1996 | Karp et al. ................... | 708/500 |
| 6,163,791 | A | 12/2000 | Schmookler et al. | |
| 7,366,748 | B1 * | 4/2008 | Tang et al. ................... | 708/446 |
| 7,634,527 | B2 * | 12/2009 | Dance et al. ................. | 708/502 |
| 2002/0116431 | A1 * | 8/2002 | Ho et al. ...................... | 708/502 |
| 2002/0143840 | A1 * | 10/2002 | Krouglov et al. ............ | 708/654 |
| 2004/0093367 | A1 * | 5/2004 | Shearer ........................ | 708/502 |
| 2005/0027772 | A1 * | 2/2005 | Enenkel et al. .............. | 708/502 |
| 2005/0289208 | A1 * | 12/2005 | Harrison et al. ............. | 708/502 |
| 2006/0136540 | A1 | 6/2006 | Tang et al. | |
| 2007/0083586 | A1 * | 4/2007 | Luo et al. .................... | 708/502 |

FOREIGN PATENT DOCUMENTS

KR     10-1999-72273 A1    9/1999

OTHER PUBLICATIONS

Pending U.S. Appl. No. 09/609,496, filed Jun. 30, 2000 (inventor: Kubaska et al.).
Takagi, Naofumi, "A Hardware Algorithm for Computing Reciprocal Square Root", 15th IEEE Symposium on Computer Arithmetic, 2001, pp. 94-100.
Greer et al., "Scientific Computing on the Itanium Processor", Proceedings of the 2001 ACM/IEEE conference on Supercomputing, Denver, USA. Nov. 2001, pp. 1-8.
Kahan, W., "Lecture Notes on the Status of IEEE standard 754 for binary floating-point Arithmetic", IEEE Standard 754 for Binary Floating-Point Arithmetic, Berkeley, USA. May 1996, available at http://www.cs.berkeley.edu/~wkahan/ieee754status/ieee754.ps, pp. 1-8.

* cited by examiner

*Primary Examiner* — David H Malzahn
(74) *Attorney, Agent, or Firm* — Blakely, Sokoloff, Taylor & Zafman LLP

(57) ABSTRACT

A new function for calculating the reciprocal residual of a floating-point number X is defined as recip_residual(X)=1−X*recip(X), where recip(X) represents the reciprocal of X. The function may be implemented using a fused multiply-add unit in a processor. The reciprocal value of X, recip(X), may be obtained from a lookup table. The recip_residual function may help reduce the latency of many multiplicative functions that are based on products of multiple numbers and can be expressed in simple terms of functions on each individual number (e.g., log(U*V)=log(U)+log(V)).

11 Claims, 6 Drawing Sheets ured. The main memory 150 may store data and sequences of instructions that are executed by multiple cores of the processor 110 or any other device included in the
METHOD AND APPARATUS FOR PERFORMING MULTIPLICATIVE FUNCTIONS

BACKGROUND

1. Field

This disclosure relates generally to computer processor technologies, and more specifically but not exclusively, to arithmetic operations in a processor.

2. Description

Many modern computing architectures provide a hardware reciprocal instruction, Y=recip(X), to calculate an approximate value for the reciprocal of an operant (e.g., X). Such a reciprocal instruction is very useful for implementing floating point division functions. It is also very useful for argument reduction in software implementation of many other algebraic and transcendental functions in general (e.g., cube root, sine, cosine, exponential, and logarithmic operations). For example, instead of implementing a floating point division operation A/B in hardware, a processor may first calculate recip(B) using the hardware reciprocal instruction followed by a multiplication operation between A and recip(B) because a floating point division has more complexity than addition, subtraction, and multiplication.

Typically, a hardware reciprocal instruction, Y=recip(X) has the following property:

$$Y=(1/X)\cdot(1-\epsilon), |\epsilon|\leq\Delta, \tag{1}$$

where $\Delta$ is a uniform threshold. For example, $\Delta$ is of the order of $2^{-8.8}$ on an Intel® Itanium™ processor so that the reciprocal is accurate to at least about 8.8 significant bits. The approximate reciprocal Y can then be "refined" to a fully accurate reciprocal, or used in a refinement process to obtain a fully accurate quotient where X is the denominator. In the case where an approximate reciprocal is provided, a processing architecture usually offers additional support so that the above mentioned refinement can be conveniently calculated. The common additional support is the so called fused-multiply-add instruction where the value A×B+C is computed exactly before rounded to the floating-point format in question (as opposed to computing A*B first, rounding the result of A×B next, followed by adding C). The refinement process is effected by first computing Y=recip(X), then E=1−Y*X. An appropriate computation sequence involving Y and E follows. In many practical situations, it is observed that the value E lies in the critical path. However, the value recip(X) is in fact not needed in many cases. Thus, it is desirable to reduce the latency of the refinement process by removing recip(X) calculation in the critical process of the refinement process.

BRIEF DESCRIPTION OF THE DRAWINGS

The features and advantages of the disclosed subject matter will become apparent from the following detailed description of the subject matter in which.

DETAILED DESCRIPTION

According to embodiments of the subject matter disclosed in this application, a new function for calculating the reciprocal residual of a floating-point number X is defined as recip_residual(X)=1−X*recip(X), where recip(X) represents the reciprocal of X. The function may be implemented using a fused multiply-add unit in a processor and returns the reciprocal residual value of X directly. The reciprocal value of X, recip(X), may be obtained from a lookup table. The recip_residual function may be implemented in latency comparable to that of a reciprocal function. The recip_residual function may help reduce the latency of many multiplicative functions that are based on products of multiple numbers and can be expressed in simple terms of functions on each individual number (e.g., log(U*V)=log(U)+log(V)).

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
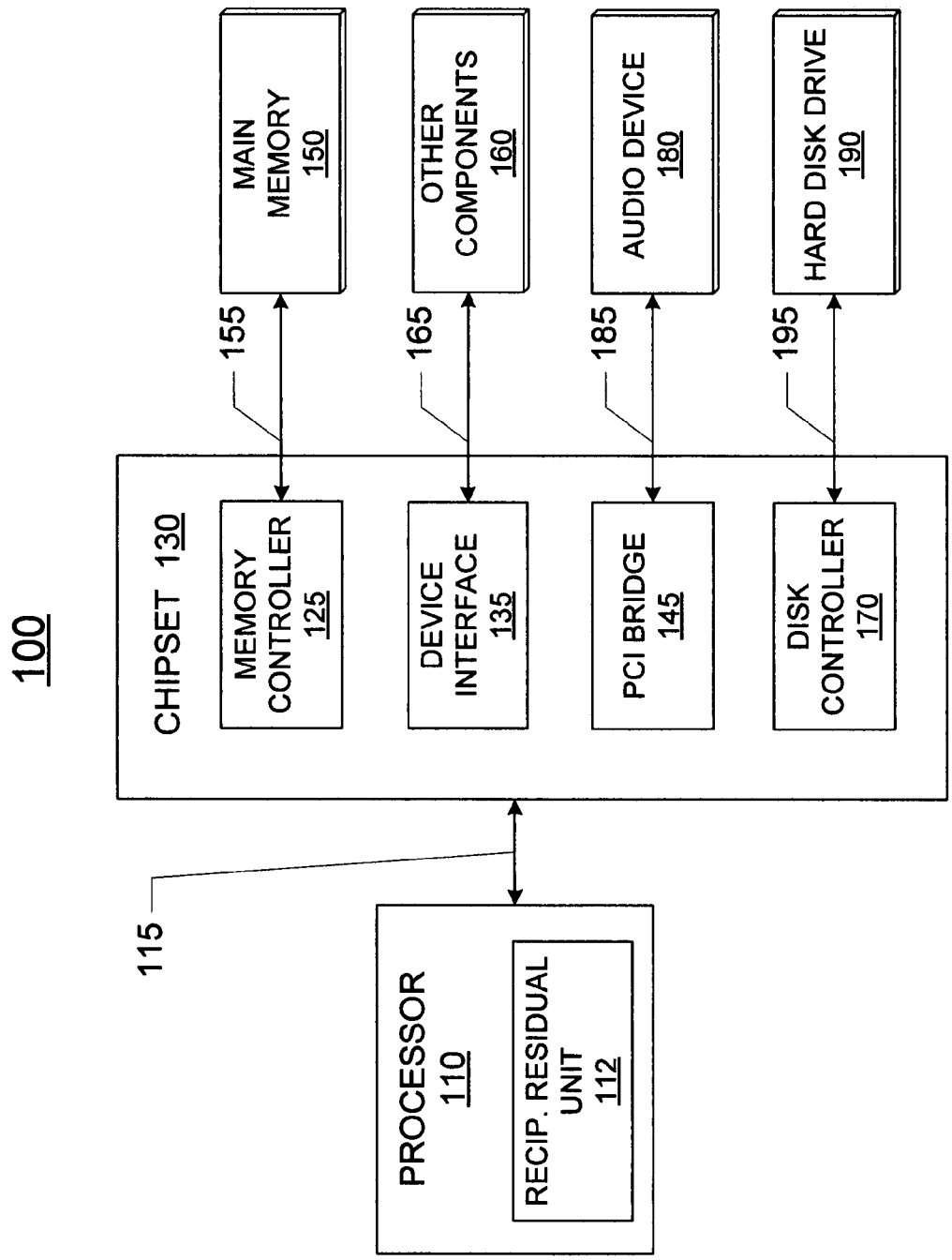
FIG. 1 shows one example computing system where a reciprocal residual unit may be included in the processor of the system to calculate the reciprocal residual of a floating point value.

FIG. 1 shows one example computing system 100 where a reciprocal residual unit may be included in the processor of the system to calculate the reciprocal residual of a floating point number, according to an embodiment of the subject matter disclosed in the present application. Computing system 100 may comprise one or more processors 110 coupled to a system interconnect 115. Processor 110 may have multiple or many processing cores (for brevity of description, term "multiple cores" will be used hereinafter to include both multiple processing cores and many processing cores). The computing system 100 may also include a chipset 130 coupled to the system interconnect 115. Chipset 130 may include one or more integrated circuit packages or chips. Chipset 130 may comprise one or more device interfaces 135 to support data transfers to and/or from other components 160 of the computing system 100 such as, for example, keyboards, mice, network interfaces, etc. The device interface 135 may be coupled with other components 160 through a bus 165. Chipset 130 may be coupled to a Peripheral Component Interconnect (PCI) bus 185. Chipset 130 may include a PCI bridge 145 that provides an interface to the PCI bus 185. The PCI Bridge 145 may provide a data path between the processor 110 as well as other components 160, and peripheral devices such as, for example, an audio device 180. Although not shown, other devices may also be coupled to the PCI bus 185.

Additionally, chipset 130 may comprise a memory controller 125 that is coupled to a main memory 150 through a memory bus 155. The main memory 150 may store data and sequences of instructions that are executed by multiple cores of the processor 110 or any other device included in the system. The memory controller 125 may access the main memory 150 in response to memory transactions associated with multiple cores of the processor 110, and other devices in the computing system 100. In one embodiment, memory controller 125 may be located in processor 110 or some other circuitries. The main memory 150 may comprise various memory devices that provide addressable storage locations which the memory controller 125 may read data from and/or write data to. The main memory 150 may comprise one or more different types of memory devices such as Dynamic Random Access Memory (DRAM) devices, Synchronous DRAM (SDRAM) devices, Double Data Rate (DDR) SDRAM devices, or other memory devices.

Moreover, chipset 130 may include a disk controller 170 coupled to a hard disk drive (HDD) 190 (or other disk drives not shown in the figure) through a bus 195. The disk controller allows processor 110 to communicate with the HDD 190. In some embodiments, disk controller 170 may be integrated into a disk drive (e.g., HDD 190). There may be different types of buses coupling disk controller 170 and HDD 190, for example, the advanced technology attachment (ATA) bus and PCI Express (PCI-E) bus.

Processor 110 may have an arithmetic logic unit ("ALU") (not shown in the figure) for performing arithmetic operations. The ALU may perform arithmetic operations for both fixed-point and floating-point data. The ALU may include a reciprocal residual unit 112 to calculate the reciprocal residual for a floating-point number. The reciprocal residual of a floating-point number X is defined as $1-X*recip(X)$, where $recip(X)$ is the reciprocal of X and may be obtained from a lookup table. The reciprocal residual unit 112 may be designed to obtain the reciprocal residual of X in latency comparable to latency of calculating the reciprocal of X. In many applications such as a refinement process to obtain an accurate result for a division operation, the reciprocal residual value rather than the reciprocal value of a number lies in the critical path. Thus, having the reciprocal residual unit 112 to directly obtain the reciprocal residual of a number may reduce the latency of some functions such as a floating point division by using a lookup table for reciprocal of a number.

Figure 2:
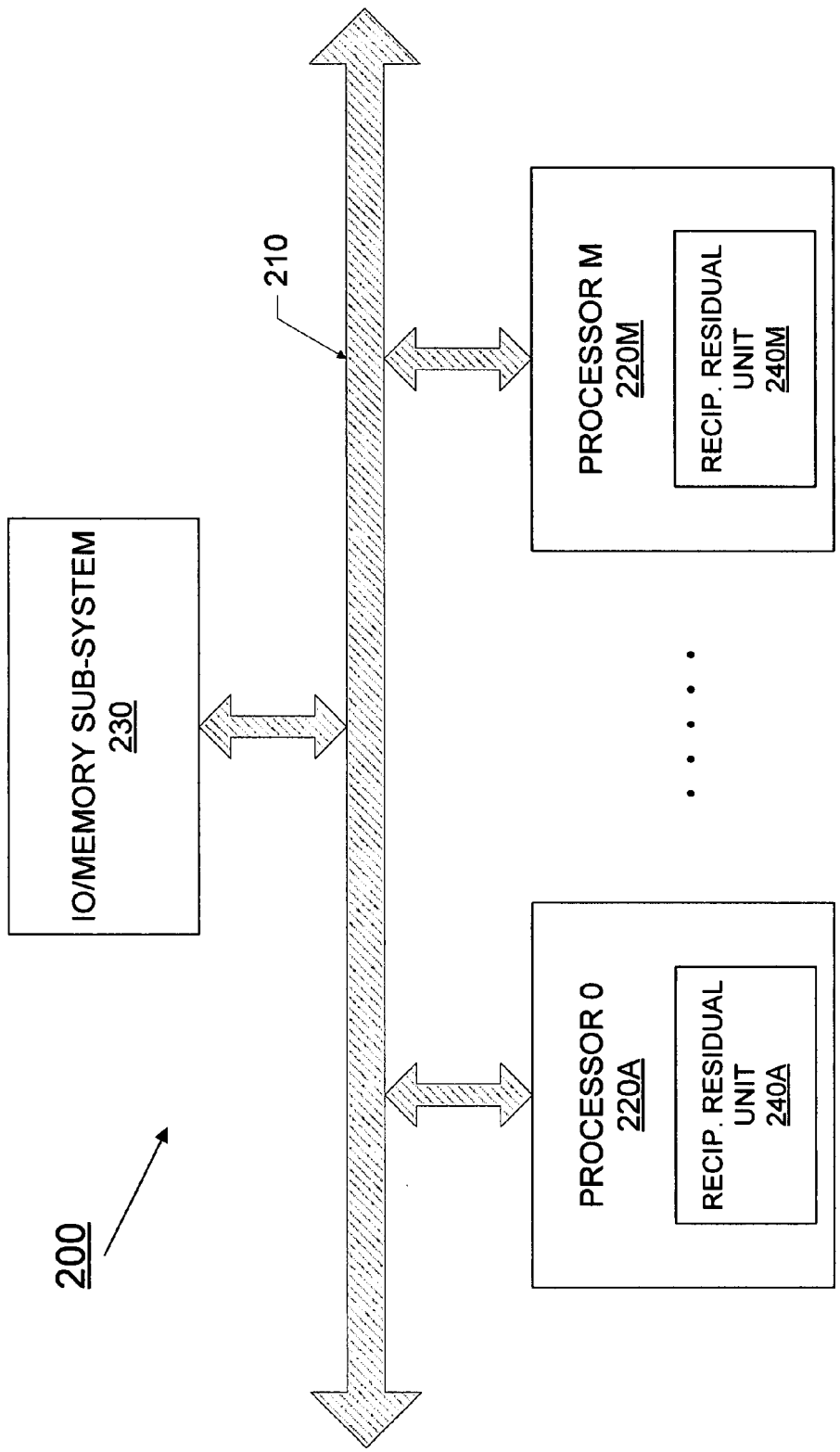
FIG. 2 shows another example computing system where a reciprocal residual unit may be included in the processor of the system to calculate the reciprocal residual of a floating point value.

FIG. 2 shows another example computing system 200 where a reciprocal residual unit may be included in the processor of the system to calculate the reciprocal residual of a floating point number, according to an embodiment of the subject matter disclosed in the present application. System 200 may comprise multiple processors such as processors 220A. One or more processors in system 200 may have multiple cores. One or more processors (e.g., 220A) may include a reciprocal residual unit (e.g., 240A or 240M) to calculate the reciprocal residual for a floating-point number X. The reciprocal residual of a floating-point number X is defined as $1-X*recip(X)$, where $recip(X)$ is the reciprocal of X and may be obtained from a lookup table. Having the reciprocal residual unit (e.g., 240A) to directly obtain the reciprocal residual of a number may reduce the latency of some functions such as a floating point division by using a lookup table for reciprocal of a floating point number. It should be noted that although each processor in the figure is shown to include a reciprocal residual unit, it is not necessary for each processor to have such a unit. Some processors may have a reciprocal residual unit while others might not include such a unit.

Processors in system 200 may be connected to each other using a system interconnect 210. System interconnect 210 may be a Front Side Bus (FSB). Each processor may be connected to Input/Output (IO) devices as well as memory 230 through the system interconnect.

Figure 3:
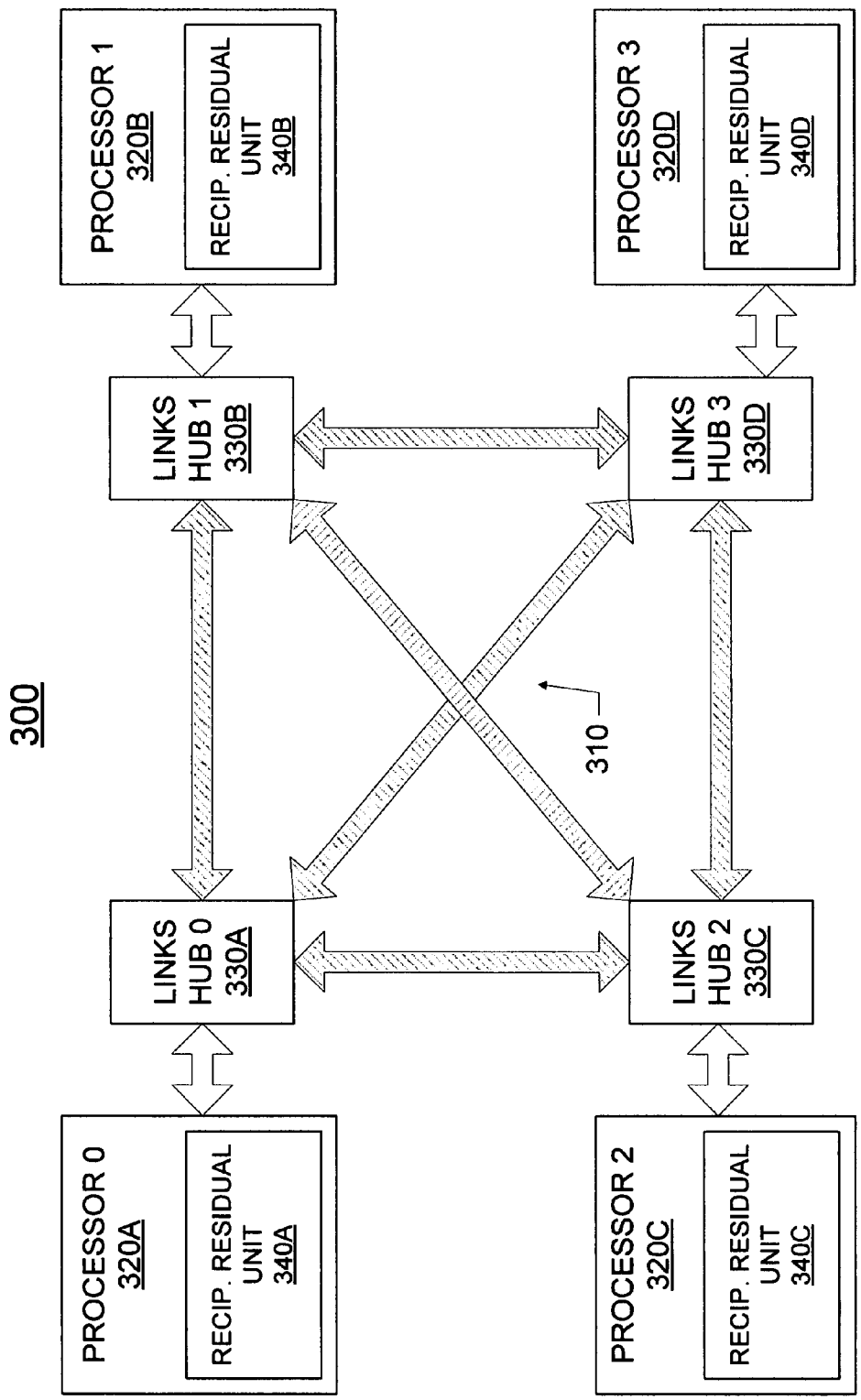
FIG. 3 shows yet another example computing system where a reciprocal residual unit may be included in the processor of the system to calculate the reciprocal residual of a floating point value.

FIG. 3 shows yet another example computing system 300 where a reciprocal residual unit may be included in the processor of the system to calculate the reciprocal residual of a floating point number, according to an embodiment of the subject matter disclosed in the present application. In system 300, system interconnect 310 that connects multiple processors (e.g., 320A, 320B, 320C, and 320D) is a links-based point-to-point connection. Each processor may connect to the system interconnect through a links hub (e.g., 330A, 330B, 330C, and 330D). In some embodiments, a links hub may be co-located with a memory controller, which coordinates traffic to/from a system memory. One or more processor may have multiple cores.

One or more processors (e.g., 320A) may include a reciprocal residual unit (e.g., 340A, 340B, 340C, or 340D) to calculate the reciprocal residual for a floating-point number X. The reciprocal residual of a floating-point number X is defined as $1-X*recip(X)$, where $recip(X)$ is the reciprocal of X and may be obtained from a lookup table. Having the reciprocal residual unit (e.g., 340A) to directly obtain the reciprocal residual of a number may reduce the latency of some functions such as a floating point division by using a lookup table for reciprocal of a floating point number. It should be noted that although each processor in the figure is shown to include a reciprocal residual unit, it is not necessary for each processor to have such a unit. Some processors may have a reciprocal residual unit while others might not include such a unit.

Figure 4:
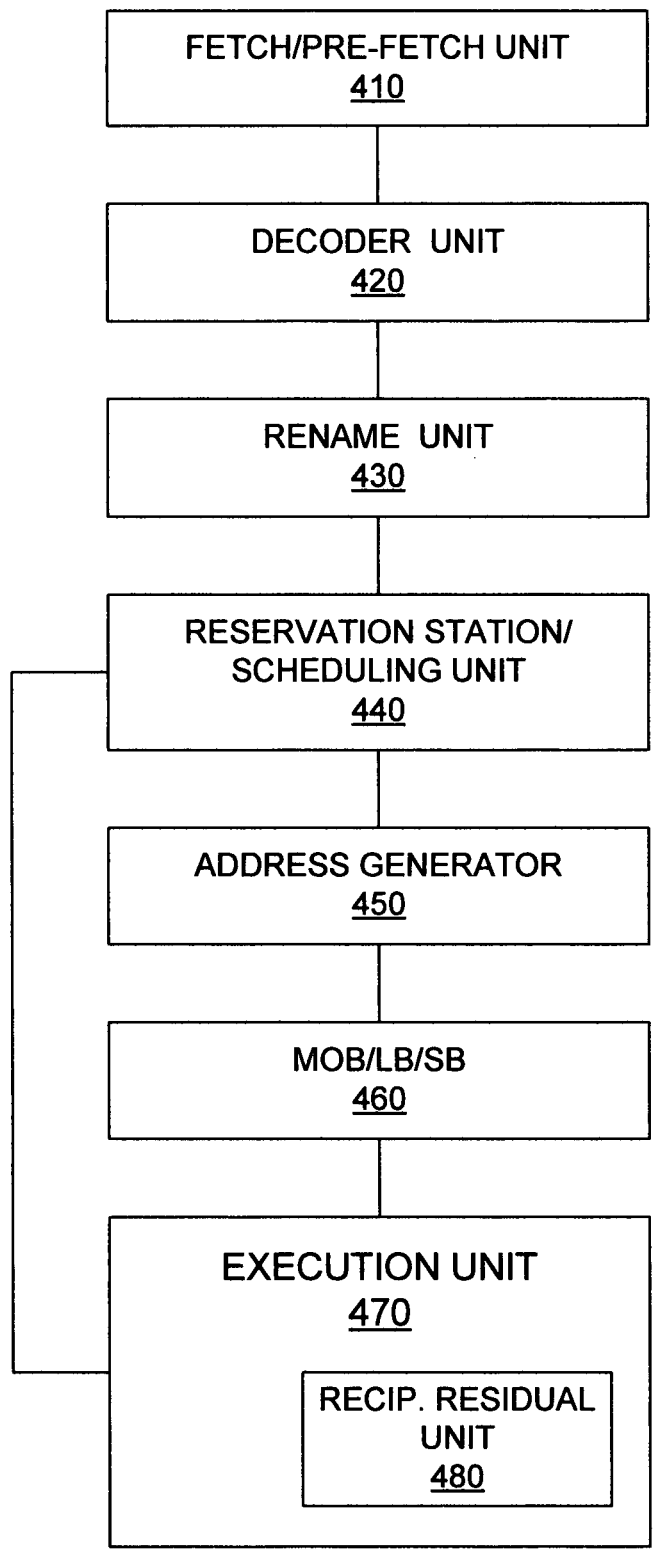
FIG. 4 illustrates a portion of a processor having a reciprocal residual unit to calculate the reciprocal residual of a floating point value.

FIG. 4 illustrates a portion of a processor 400 having a reciprocal residual unit to calculate the reciprocal residual of a floating point number, according to an embodiment of the subject matter disclosed in the present application. Processor 400 comprises a fetch/pre-fetch unit 410, a decoder unit 420, a rename unit 430, a reservation station/scheduling unit 440, an address generator 450, a MOB/LB/SB 460, and an execution unit 470. It should be noted that for each of the above components, processor 400 may include more than unit (e.g., processor 400 may have more than one decoder unit). Also processor 400 may comprise other components not shown in the figure (e.g., processor 400 may include a first-level cache to store instructions and data).

Fetch/pre-fetch unit 410 fetches or pre-fetches instructions/data for decoder unit 420 which decodes instructions. Rename unit 430 assigns registers to appropriate instructions or uops (micro-operations). Reservation station/Scheduling unit 440 schedules and stores instructions or uops, such as uops corresponding to loads and stores, until their respective target addresses are determined. When loads and stores are dispatched from the reservation station, they may be sent to address generator 450, which generates a corresponding linear address for the loads and stores to be sent to memory or cache. Load operations are typically dispatched from the reservation station into a load buffer ("LB") within memory ordering buffer ("MOB") (shown as MOB/LB/SB (Store Buffer) 460 in the figure), where the loads are checked for conflicts and dependencies with other store operations. If no conflicts or dependencies with stores exist, a load operation may be dispatched to the memory/cache cluster. Otherwise, the load operation may have to wait in the MOB until the dependencies and/or conflicts are resolved before being dispatched to memory/cache. Once the loads are dispatched to memory/cache, the memory/cache may return data targeted by the loads to the reservation station 440, which may use the loaded data to generate an address to the next operand of some successive uop to be dispatched from the scheduler/reservation station 440.

Store operations, which may include STA uops, may follow a similar path as loads. However, stores are not typically allowed to be dispatched to the memory/cache out of program order, whereas loads may be dispatched to memory/cache anytime when no dependencies/conflicts exist between the loads and other store operations. In some processors, the MOB (e.g., 460) is used to store load and store operations in proper order, such that all store operations to write information to a memory location are dispatched and allowed to write their information to memory before load operations that may use information from the same address. Store operations appearing in program order before corresponding load operations (i.e. load operations having the same target address as the earlier store operations) may be referred to as "older" store operations and the corresponding load operations may be referred to as "newer" load operations than the earlier store operations in program order.

Loads may access memory out of program order in relation to stores if no dependencies/conflicts between the loads and stores exist. In some processors, loads being processed before older pending stores are assumed to always correspond to the same target memory address in order to prevent the chance that an earlier processed load could load data that was to be updated by the older store, and therefore produce an incorrect result in whatever program they corresponded to by returning obsolete information.

Execution unit 470 may decode instructions with data loaded from memory or cache. The execution unit may include numerous special-purpose units, such as integer units, floating-point units, branch units, and others. The Execution unit 470 may include a reciprocal residue unit 480 to calculate a reciprocal residual value for a floating point number. The reciprocal residual unit 480 may directly return the reciprocal residual of a number without first calculating the reciprocal of the number (which may be obtained from a lookup table). The reciprocal residual unit 470 is described in more details below.

Figure 5:
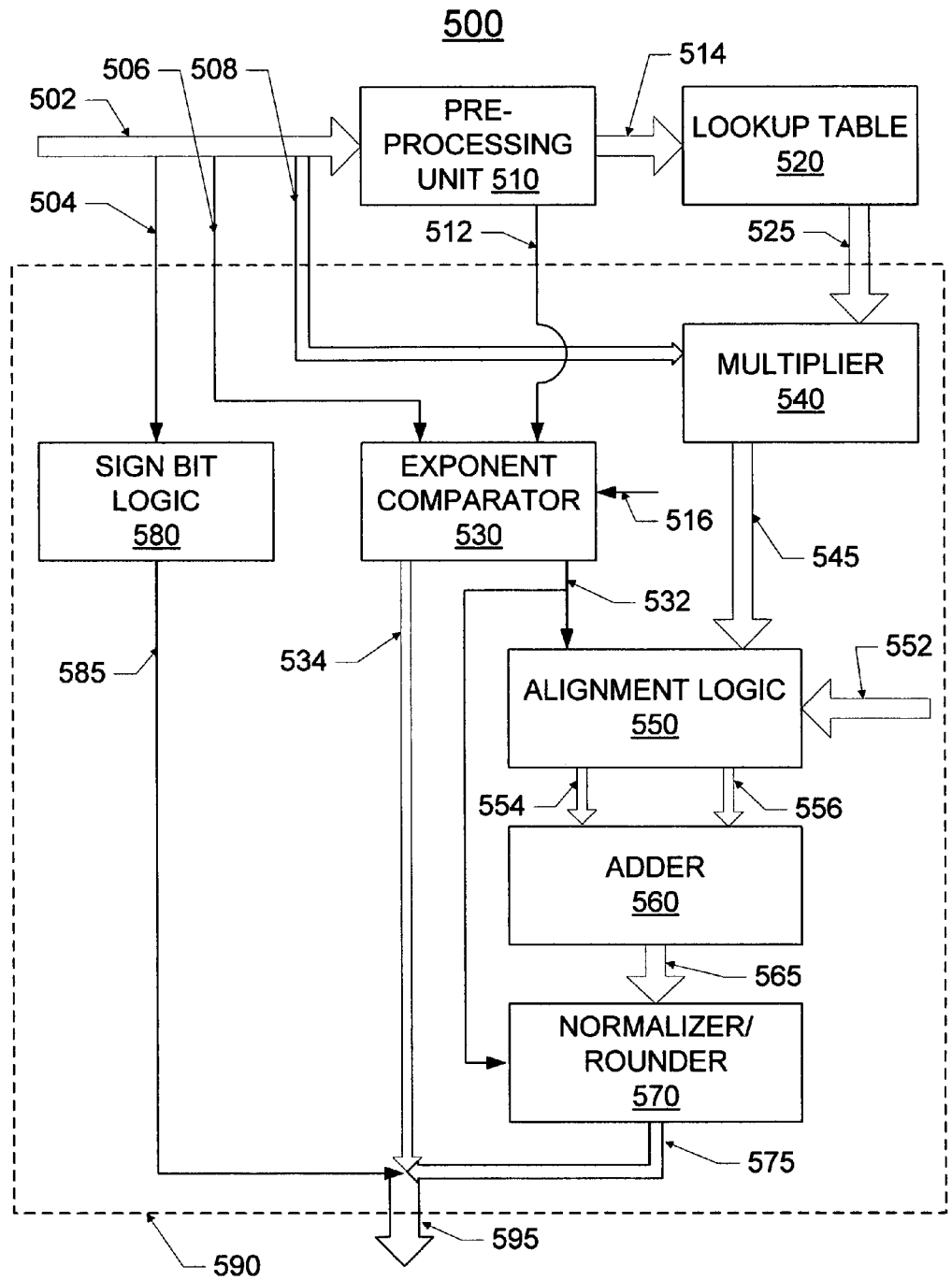
FIG. 5 illustrates a diagram of a reciprocal residual unit which may be used to calculate the reciprocal residual of a floating point value.

FIG. 5 illustrates a diagram of a reciprocal residual unit 500 which may be used to calculate the reciprocal residual of a floating point number X, i.e., $1-X*recip(X)$, according to an embodiment of the subject matter disclosed in the present application. Reciprocal residual unit 500 may comprise a pre-processing unit 510, at least one lookup table 520, a multiplier 540, alignment logic 550, an adder 560, and a normalizer/rounder 570. FIG. 5 shows that reciprocal residual unit 500 also includes an exponent comparator 530 and sign bit logic 580. These two components are typically necessary along with multiplier 540, alignment logic 550, adder 560, and normalizer/rounder 570 for a fused multiply-add ALU 590. By including exponent comparator 530 and sign bit logic 580, FIG. 5 shows that reciprocal residual unit 500 may be implemented using an existing fused multiply-add ALU in one embodiment. In fact, it is not necessary to have a exponent comparator or sign bit logic for calculating $1-X*recip(X)$ because both signs and exponents of X and recip(X) will cancel each other out in the operation of $X*recip(X)$. Thus, in another embodiment of the subject matter disclosed in the present application, reciprocal residual unit may be implemented without using an existing fused multiply-add ALU and might not have an exponent comparator or sign bit logic.

Reciprocal residual unit 500 receives a floating point number (shown as 502), X, which may be represented in a format of [s, K, B], where K and B are represented by a binary format (e.g., $K=k_{J-1} k_{J-2} \ldots k_1 k_0$; $B=b_0.b_1 b_2 \ldots b_{N-1}$). The value of X equals $(-1)^s * B * 2^K$. B and K are also called mantissa and exponent of X, respectively. Pre-processing unit 510 receives mantissa B of X as an input and rounds it to L significant bits where $L<=N$ (e.g., $L=8$ and $N=24$). Typically, $b_0$ of B is 1 and after rounding up $b_{L-1}=1$. As a result, the rounded mantissa B' may be represented in a binary format such as $1.b_1 b_2 \ldots b_{L-2} 1$.

Lookup table 520 receives $b_1 b_2 \ldots b_{L-2}$ as input (shown as 514 in the figure), looks up in the table and outputs the reciprocal for B' (i.e., $1/B'=1/(1.b_1 b_2 \ldots b_{L-2} 1)$). Lookup table 520 pre-stores reciprocal values for all possible values of B'. Since B' has L–2 bits that can be variable, lookup table 520 may be pre-designed as an (L–2)-bit lookup table. The reciprocal value of B' may be M bits long and may be represented in a binary format such as $0.1 z_2 \ldots z_{M-1} z_M$. L and M may be flexible depending on the performance and real-estate tradeoffs. Usually M>L, for example, M=L+2. Basically, lookup table 520 produces the reciprocal value for the normalized value of X (i.e., $X'=(-1)^s*B=(-1)^s*(1.b_1 b_2 \ldots b_{N-1})$). Since the exponent parts of X and recip(X) will cancel each other out in the operation of $X*recip(X)$, the reciprocal residual of X is normally the same as the reciprocal residual of X', i.e., $1-X*recip(X)=1-X'*recip(X')$. In fact, using recip(X') rather than recip(X) to obtain the reciprocal residual of X has its advantages. For example, recip(X') is very unlikely to be underflow or overflow while recip(X) may be overflow/underflow when the absolute value of X is very small/large.

When an existing fused multiply-add ALU is used, pre-processing unit may also receive the exponent of X (i.e., K) and produce an exponent for recip(X) (shown as 512 in the figure), which is –K. The exponent 506 of X, the exponent 512 of recip(X), and the exponent 516 of 1 (which is 0) are inputs to exponent comparator 530, which compare the value of (exponent of X+exponent of recip(X)) and the exponent of 1. The greater of the two terms is the output 534 along with an indicator of which term is greater and the difference between output 534 and the other term (the indicator and the difference are shown as 532 in the figure). Sign bit logic 580 receives the sign of X (shown as 504) and handles the sign of the input data as it does for a fused multiply-add ALU. As explained above, for the purpose of calculating the reciprocal residual value of X, it is not necessary to have an exponent comparator or sign bit logic. When an existing multiply-add ALU is used, it is convenient to provide an existing exponent comparator and an existing sign bit logic with their desired inputs even though their outputs might not affect the computation of the reciprocal residual value of X.

Multiplier 540 receives output 525 from lookup table 520 and mantissa B ($b_0.b_1 b_2 \ldots b_{N-1}$) of X. Output 525 represents the mantissa of recip(B') in a binary format (e.g., $0.1 z_2 \ldots z_{M-1} z_M 0 0 \ldots 0$), which is an approximate reciprocal of X', a normalized value of X. Multiplier 540 calculates a product of output 525 and mantissa B of X. In other words, multiplier 540 produces a product of X' and recip(X') (shown as 545 in the figure).

Alignment logic 550 receives product 545 of X' and recip (X') from multiplier 540, input 552 which is 1, and the indicator and difference 532 from exponent comparator 530. Based on the indicator and difference 532, alignment logic 550 aligns bits in product 545 and bits in input 552. If the indicator and difference 550 is 0, which means the exponent of 1 equals the exponent of X plus the exponent of recip(X), alignment logic 550 does not need to do anything with product 545 or input 552. As mentioned above, the result of exponent of X plus the exponent of recip(X) is typically 0, that is, alignment logic 550 typically does not do anything when reciprocal residual unit 500 is calculating reciprocal residual of floating point data. Alignment logic 550 is here primarily because a fused multiply-add ALU is used for calculating reciprocal residual of floating point data. In another embodiment, if a fused multiply-add ALU is not used, alignment logic might not be needed in a reciprocal residual unit.

Adder 560 receives product 545 and input 552 to alignment logic 550, as each may have been shifted to align with each other by alignment logic 550, and performs add operations, which subtract product 545 from input 552, i.e., 1−X'*recip(X'), to produce the intermediate result 565 of the reciprocal residual 1−X'*recip(X').

Normalizer/rounder 570 normalizes the intermediate result 565 such that the most significant bit of the magnitude of the mantissa is nonzero. Normalizer/rounder 570 generates a normalized result of the specified operation, and may also generate a "sticky" bit, as known in the art of floating point arithmetic, which yields information about any bits eliminated in the normalization process. Normalizer/rounder 570 also rounds the normalized result, using the sticky bit if provided, and returns the result (shown as 575 in the figure) of the operation of reciprocal residual unit 500, rounded and formatted in the floating point format according to which reciprocal residual unit 500 is implemented. Although in a typical fused multiply-add operation, output 585 from sign bit logic 580, and output 534 of exponent comparator 530 may be used together with output 575 to form final output 595 of reciprocal residual unit 500, the final output 595 is usually the same as the output 575 of normalizer/rounder 570 when only reciprocal residual operation is performed by the unit 500.

Because recip(X') is M bits long based on an approximate value of X' (rounded to L significant bits), at least the top L bits in 1−X'*recip(X') will cancel out. Thus, the computation in both multiplier 540 and adder 560 does not require general fused multiply-add capability. Multiplier 540 may only need to compute the least significant portion of X'*recip(X') to a width comparable to whatever working precision is desired. Moreover, lookup table 520 for recip(X') may be stored in any form, including Booth encoded form, to further speed up the multiplication.

Figure 6:
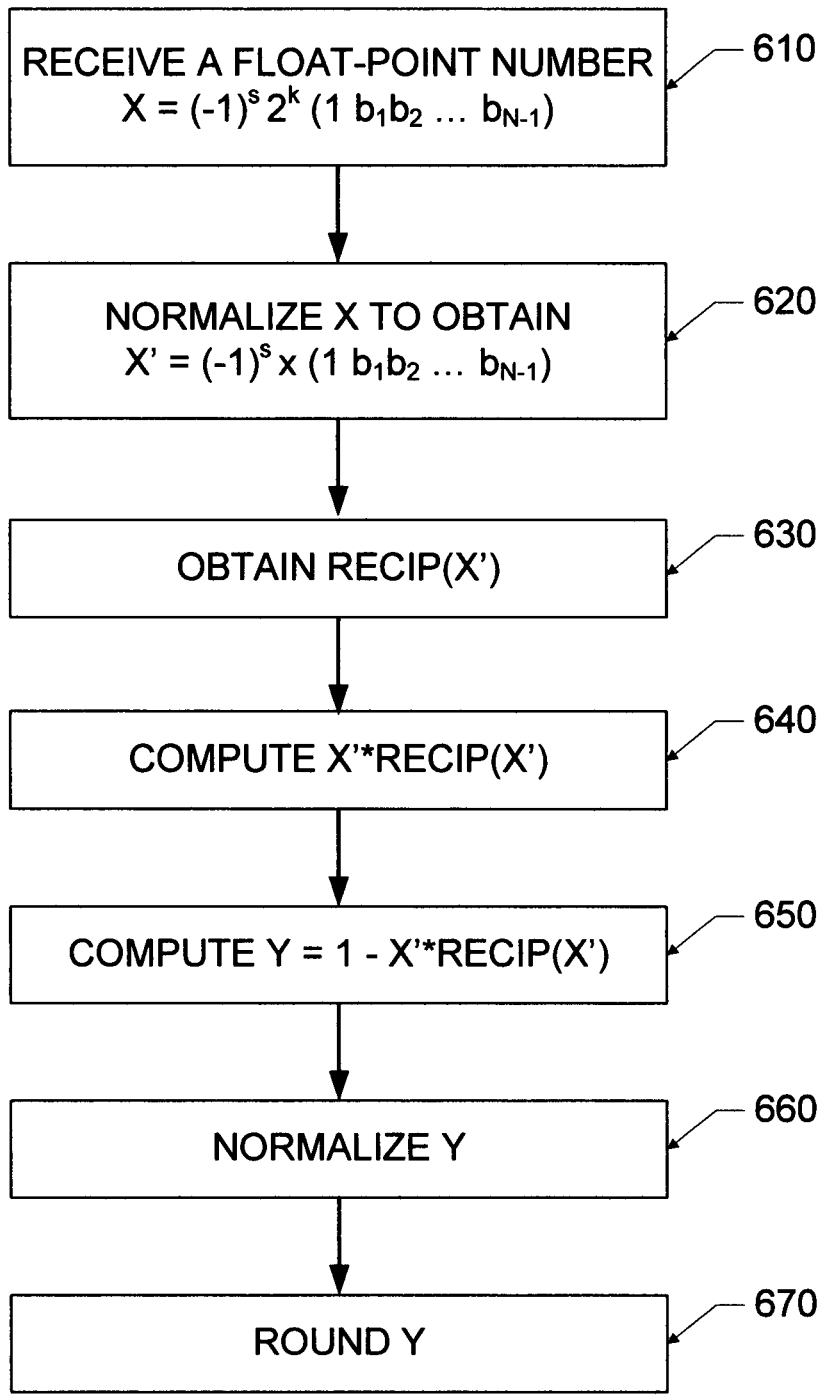
FIG. 6 is a flowchart of one example process for calculating the reciprocal residual of a floating point value.

FIG. 6 is a flowchart of one example process 600 for calculating the reciprocal residual of a floating point number. At block 610, a floating point number X in a format according to which a reciprocal residual unit (e.g., 500) is implemented may be received. For example, $X=(-1)^s*B*2^K=(-1)^s*2^K*(1.b_1 b_2 \ldots b_{N-1})$, where K may be J bits long, i.e., $K=k_{J-1} k_{J-2} \ldots k_1 k_0$. At block 620, X may be normalized to obtain $X'=(-1)^s*(1.b_1 b_2 \ldots b_{N-1})$. At block 630, an approximate reciprocal of X' may be obtained from a lookup table (e.g., 520 in FIG. 5). At block 640, a product of X' and recip(X') may be computed by a multiplier. At block 650, Y=1−X'*recip(X') may be computed using an adder. At block 660, Y may be normalized such that the most significant bit of the magnitude of the mantissa is nonzero. At block 670, normalized Y may be rounded and formatted in the desired floating point format.

The reciprocal residual instruction is very useful in the computation of multiplicative type of functions. Here is an example:

$$\log_2(X) = \log_2(2^k X')$$
$$= k + \log_2(X' recip(X')/recip(X'))$$
$$= k + \log_2(1/recip(X')) + \log_2(1-(1-X' recip(X')))$$
$$= k + \text{tbl\_log2}(X) + \log_2(1-E), \text{ where tbl\_log2}(X)$$
$$= \log_2(1/recip(X')) \text{ and } E = 1 - X' recip(X')$$
$$\approx k + \text{tbl\_log2}(X) + \text{polynomial}(E)$$

This example illustrates how E=recip_residual(X) together with tbl_log 2(X) (which may be obtained by looking up a table) can be used together. An appropriate polynomial evaluated at the recip_residual value is applicable to common multiplicative functions. Any values in a lookup table are in general working precision numbers. Here is another example:

$$1/\sqrt{X} = \sqrt{recip(X)} / \sqrt{X recip(X)}$$
$$= \sqrt{recip(X)} \times (1-E)^{1/2}, \text{ where } E = 1 - X' recip(X')$$
$$\approx \text{tbl\_sqrt}(X) \times \text{polynomial}(E)$$

In general, the recip_residual function may be defined by whatever appropriate implicit definition of the reciprocal function. Accompanying table lookup function may aid computation of a function as long as the function is multiplicative in nature and admits a simple and fast convergent series expansion around x=1.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A processor, comprising:
    a reciprocal residual arithmetic logic unit ("ALU") to compute a reciprocal residual value for a floating point value wherein the reciprocal residual ALU is implemented using a fused multiply-add ALU in the processor in response to executing a reciprocal residual value instruction and the fused multiply-add ALU comprises:
        a multiplier to produce a product of X' and an approximate reciprocal value of X', X'*recip(X'), X' being a normalized value of the floating point value X and recip(X') being a reciprocal value of X', wherein the multiplier to receive the approximate reciprocal value from a (L−2) bit lookup table;
        an adder to perform 1−X'*recip(X') and to obtain an intermediate result, 1−X'*recip(X'), for the reciprocal residual value of X, the reciprocal residual value of X being 1−X* recip(X) and recip(X) being the reciprocal value of X; and
        a normalizer/rounder to normalize the intermediate result, to round the normalized intermediate result, and to output the reciprocal residual value of X.

2. The processor of claim 1, wherein the reciprocal residual ALU further comprises means for rounding X' to L significant bits, wherein in L is larger than 1 and is not larger than the total number of bits in the mantissa of X'.

3. The processor of claim 2, wherein the multiplier computes a portion of X'*recip(X') from bit (L−1) to bit (L+M−1), M being the total number of bits for a result that the multiplier is designed to produce.

4. A computing system, comprising:
    a memory to store a reciprocal residual instruction and a floating point value X; and
    a processor coupled to the memory to fetch the reciprocal residual instruction and X from the memory, the processor having a reciprocal residual arithmetic logic unit ("ALU") to execute the reciprocal residual instruction, the reciprocal residual instruction calculating a reciprocal residual value of X, the reciprocal residual value of X being 1−X* recip(X), wherein recip(X) is a reciprocal value of X and wherein the reciprocal residual ALU is implemented using a fused multiply-add ALU in the processor, and the fused multiply-add ALU comprises:
        a multiplier to produce a product of X' and an approximate reciprocal value of X', X'*recip(X'), X' being a normalized value of X, recip(X') being a reciprocal value of X', wherein the multiplier to receive the approximate reciprocal value from a (L−2) bit lookup table;
        an adder to perform 1−X'*recip(X') and to obtain an intermediate result, 1−X'*recip(X'), for the reciprocal residual value of X, the reciprocal residual value of X being 1−X* recip(X) and recip(X) being the reciprocal value of X; and
        a normalizer/rounder to normalize the intermediate result, to round the normalized intermediate result, and to output a final result, 1−X* recip(X), of the reciprocal residual value of X.

5. The system of claim 4, wherein the reciprocal residual ALU further comprises means for rounding X' to L significant bits, wherein in L is larger than 1 and is not larger than the total number of bits in the mantissa of X'.

6. The system of claim 5, wherein the multiplier computes a portion of X'*recip(X') from bit (L−1) to bit (L+M−1), N being the total number of bits for a result that the multiplier is designed to produce.

7. An apparatus for computing a reciprocal residual value of a floating point value (X), comprising:
    a multiplier to produce a product of X' and a reciprocal value of X', X'*recip(X'), X' being a normalized value of X, recip(X') being a reciprocal value of X', wherein the multiplier to receive the approximate reciprocal value from a (L−2) bit lookup table;
    an adder to perform 1−X'*recip(X') and to obtain an intermediate result, 1−X'*recip(X'), for the reciprocal residual value of X, the reciprocal residual value of X being 1−X* recip(X) and recip(X) being the reciprocal value of X; and
    a normalizer/rounder to normalize the intermediate result, to round the normalized intermediate result, and to output a final result of the reciprocal residual value of X.

8. The apparatus of claim 7, further comprising means for rounding X' to L significant bits, wherein in L is larger than 1 and is not larger than the total number of bits in the mantissa of X'.

9. The apparatus of claim 8, further comprising an (L−2) bit lookup table to return an approximate reciprocal value, recip(X'), for the rounded X'.

10. The apparatus of claim 8, wherein the multiplier computes a portion of X'*recip(X') from bit (L−1) to bit (L+M−1), M being the total number of bits for a result that the multiplier is designed to produce.

11. The apparatus of claim 7, wherein the apparatus is implemented using a fused multiply-add arithmetic logic unit in a processor.

* * * * *